United States Patent
Imai et al.

(10) Patent No.: US 7,761,752 B2
(45) Date of Patent: Jul. 20, 2010

(54) COMMUNICATION TERMINAL DEVICE

(75) Inventors: Yasuki Imai, Kyoto (JP); Yoshinori Murata, Kyoto (JP)

(73) Assignee: Murata Kikai Kabushiki Kaisha, Kyoto (JP)

( * ) Notice: Subject to any disclaimer, the term of this patent is extended or adjusted under 35 U.S.C. 154(b) by 840 days.

(21) Appl. No.: 11/670,358

(22) Filed: Feb. 1, 2007

(65) Prior Publication Data
US 2007/0195376 A1 Aug. 23, 2007

(30) Foreign Application Priority Data
Feb. 17, 2006 (JP) .............................. 2006-041200

(51) Int. Cl.
H04N 1/32 (2006.01)

(52) U.S. Cl. ....................... 714/708; 358/406; 714/811; 714/817

(58) Field of Classification Search ................. 714/708, 714/811, 817; 358/406
See application file for complete search history.

(56) References Cited

U.S. PATENT DOCUMENTS

| | | | | |
|---|---|---|---|---|
| 5,241,565 A | * | 8/1993 | Kloc et al. .................. | 375/285 |
| 5,917,896 A | * | 6/1999 | Hardy et al. ........... | 379/100.05 |
| 5,995,239 A | * | 11/1999 | Kagawa et al. .............. | 358/405 |
| 6,917,593 B2 | * | 7/2005 | Takagi et al. ................. | 370/242 |
| 7,006,261 B1 | * | 2/2006 | Mizutani et al. ............ | 358/468 |
| 7,469,368 B2 | * | 12/2008 | Chen et al. .................. | 714/710 |

FOREIGN PATENT DOCUMENTS

| JP | 10-164253 | 6/1998 |
|---|---|---|
| JP | 2001-298603 | 10/2001 |
| JP | 2002-094757 | 3/2002 |
| JP | 2003-309711 | 10/2003 |

* cited by examiner

*Primary Examiner*—Stephen M Baker
(74) *Attorney, Agent, or Firm*—Hogan Lovells US LLP

(57) ABSTRACT

A facsimile machine receives image data from a facsimile machine of another end. A Random Access Memory (RAM) stores a measured average value and fluctuation of an Eye Quality Monitor (EQM) value of the image data, and a number of error lines of the image data as an EQM data table. In past facsimile communication, a main control unit receives a training signal from the facsimile machine of the other end, and executes a training process. The main control unit measures an average value and fluctuation of an EQM value of the training signal, and compares the measured average value and the fluctuation of the EQM value with the average value and the fluctuation of the EQM value stored in the EQM data table. When there is no match, the main control unit executes the training process again.

20 Claims, 4 Drawing Sheets

FIG. 2

EQM DATA TABLE 7a

| TRANSMISSION MODE AND TRANSMISSION SPEED | AVERAGE VALUE OF EQM | FLUCTUATION OF EQM | NUMBER OF ERROR LINES OF IMAGE DATA |
|---|---|---|---|
| V17, 14400bps | 30 | 5 | 0 |
| V17, 14400bps | 20 | 3 | 0 |
| V17, 14400bps | 40 | 8 | 2 |
| V17, 14400bps | 35 | 5 | 0 |
| V29, 9600bps | 20 | 3 | 0 |
| --- | --- | --- | --- |

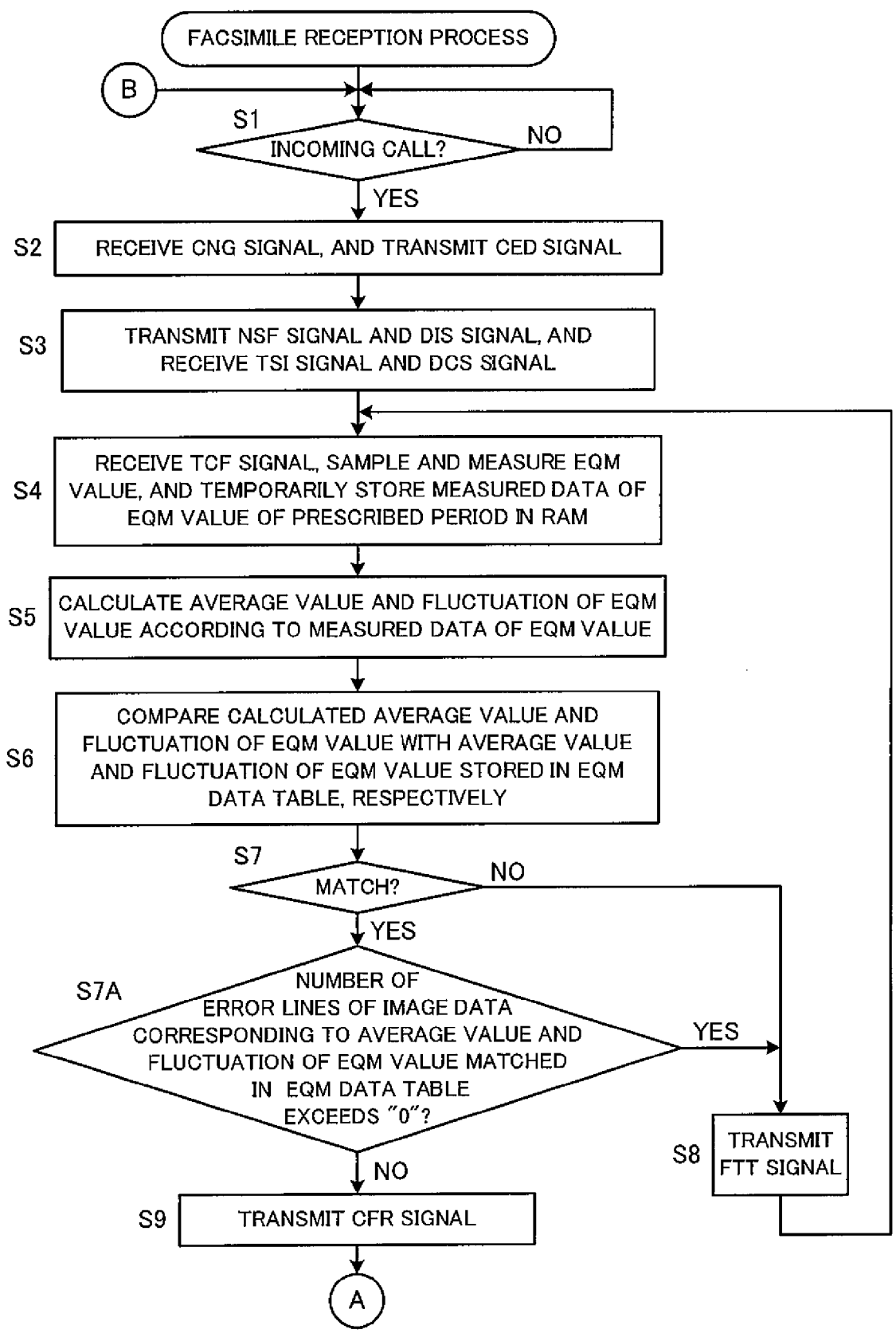

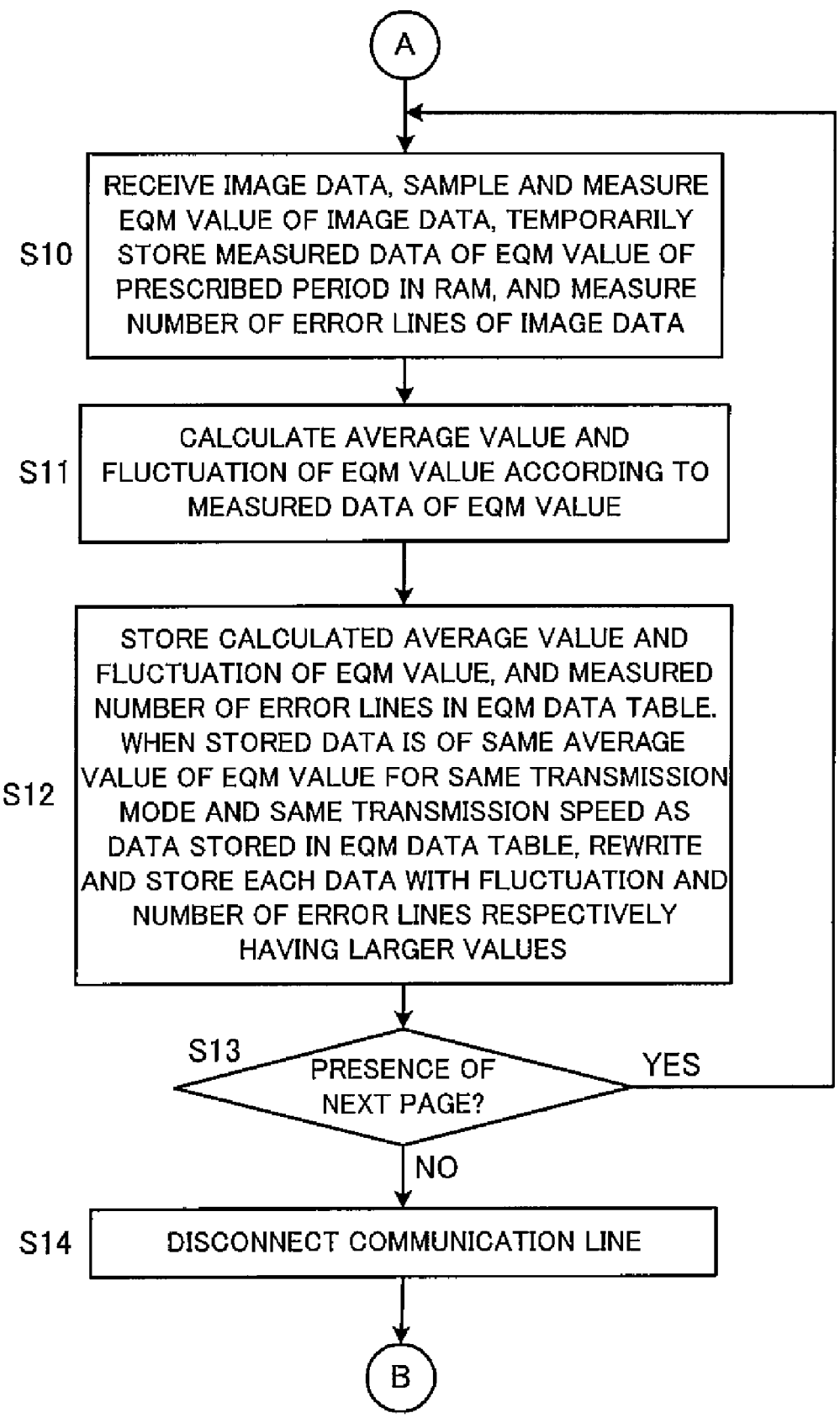

US 7,761,752 B2

COMMUNICATION TERMINAL DEVICE

RELATED APPLICATIONS

This application claims priority under 35 USC 119 in Japanese patent application no. 2006-041200, filed on Feb. 17, 2006, which application is incorporated by reference in its entirety.

BACKGROUND OF THE INVENTION

1. Field of the Invention

The present invention relates to a communication terminal device such as a facsimile machine.

2. Description of the Related Art

In a conventional communication terminal device such as a facsimile machine, a recipient communication terminal device stores a communication speed for each transmitter communication terminal device, and communicates under an optimum communication speed with each transmitter communication terminal device.

For example, in one conventional communication device, when a detecting unit detects a caller ID from a caller ID notification service at facsimile reception, and the detected caller ID is stored in a storage unit, during a training process, a Network Control Unit (NCU) and a Modulator-Demodulator (MODEM) return a Failure To Train (FTT) signal until the communication speed shifts down to the optimum signal speed that is stored and associated with the detected caller ID, and returns a Confirmation to Receive (CFR) signal under the optimum signal speed. When the detected caller ID is not stored in the storage unit, the caller ID and the optimum signal speed determined from a result of the facsimile communication are associated and stored.

However, in this conventional communication device, even when the communication speed associated with the caller ID is retrieved from the storage unit, the communication speed may not be the optimum communication speed at that point of time. According to a state of a communication line during the communication, the communication device may receive image data of low quality.

SUMMARY OF THE INVENTION

In order to overcome the problems described above, the present invention provides a communication terminal device such as a facsimile machine which reliably receives image data by considering a quality of a communication line when receiving image data.

According to an aspect of the present invention, a communication terminal device includes a storage unit and a control unit. When receiving image data by facsimile from a communication terminal device of another end, the storage unit stores a measured average value and fluctuation of an Eye Quality Monitor (EQM) value of the image data, and a number of error lines of the image data, as an EQM data table. The control unit executes a training process by receiving a training signal from the communication terminal device of the other end in a past facsimile communication, and measures an average value and fluctuation of an EQM value of the training signal. The control unit compares the measured average value and the fluctuation of the EQM value with the average value and the fluctuation of the EQM value stored in the EQM data table. When the measured average value and the fluctuation of the EQM value do not match the average value and the fluctuation of the EQM value stored in the EQM data table, the control unit executes the training process again.

In the above-described communication terminal device, when the measured average value and the fluctuation of the EQM value match the average value and the fluctuation of the EQM value stored in the EQM data table, the control unit controls to receive the image data.

In the above-described communication terminal device, when the measured average value and the fluctuation of the EQM value match the average value and the fluctuation of the EQM value stored in the EQM data table, before receiving the image data, in case the number of the error lines of the image data stored in the EQM data table associated with the matched average value and the fluctuation of the EQM value exceeds 0, the control unit controls to execute the training process again.

According to the above-described communication terminal device of the present invention, by considering a quality of a communication line when receiving image data, the communication terminal device such as a facsimile machine receives the image data even more reliably. Moreover, since a transmission route is determined according to the previously measured EQM value of the image data, the communication terminal device of the present invention receives the image data even more reliably. Furthermore, since the transmission route is determined according to the previously measured number of error lines of the image data, the communication terminal device of the present invention receives the image data even more reliably.

Other features, elements, processes, steps, characteristics and advantages of the present invention will become more apparent from the following detailed description of embodiments of the present invention with reference to the attached drawings.

BRIEF DESCRIPTION OF THE DRAWINGS

FIG. 2 is an example of an EQM data table stored in a RAM of FIG. 1.

FIGS. 3A and 3B are flowcharts of a facsimile reception process executed by a main control unit of the facsimile machine of FIG. 1.

DETAILED DESCRIPTION OF THE INVENTION

Figure 1:
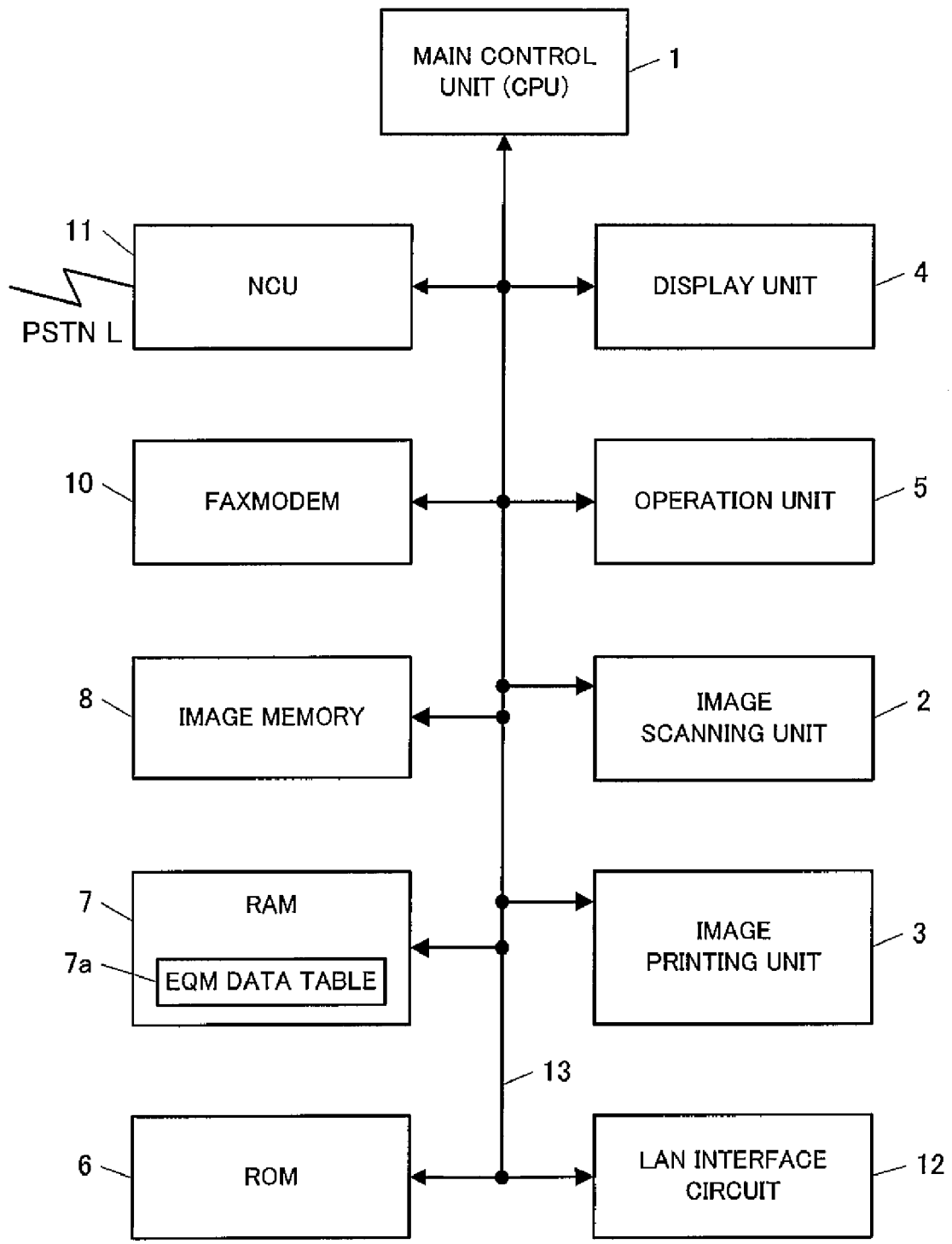
FIG. 1 is a block diagram of a facsimile machine according to an embodiment of the present invention.

Embodiments of the present invention are now described with reference to the drawings. In the following description, like reference numerals are assigned to like constituent elements.

FIG. 1 is a block diagram of a facsimile machine 20 according to an embodiment of the present invention. The facsimile machine 20 receives image data from a facsimile machine of another end. A Random Access Memory (RAM) 7 stores measurements of an average value and fluctuation of an Eye Quality Monitor (EQM) value of the image data, and a number of error lines of the image data as an EQM data table 7a. In a past facsimile communication, a main control unit 1 receives a training signal from the facsimile machine of the other end, and executes a training process (step S4 of FIG. 3A). The main control unit 1 measures an average value and fluctuation of an EQM value of the training signal (steps S4 and S5). The main control unit 1 compares the measured average value and the fluctuation of the EQM value with the average value and the fluctuation of the EQM value stored in the EQM data table 7a (steps S6 and S7). When the measured average value and the fluctuation of the EQM value do not match with the average value and the fluctuation of the EQM value stored in the EQM data table 7a (step S7: NO), the main control unit 1 executes the training process again (step S8). When the measured average value and the fluctuation of the EQM value match with the average value and the fluctuation of the EQM value stored in the EQM data table 7a (step S7: YES), the main control unit 1 controls to receive image data (steps S9 and S10).

In the facsimile machine 20, when the measured average value and the fluctuation of the EQM value match with the average value and the fluctuation of the EQM value stored in the EQM data table 7a, before receiving image data (steps S9 and S10), the main control unit 1 determines whether or not the number of the error lines of the image data stored in the EQM data table 7a associated with the matched average value and the fluctuation of the EQM value exceeds 0 (step S7A). When a determination of "YES" is made at step S7A, the main control unit 1 executes the training process again (step S8).

In FIG. 1, the facsimile machine 20 includes the main control unit (Central Processing Unit (CPU)) 1, an image scanning unit 2, an image printing unit 3, a display unit 4, an operation unit 5, a Read Only Memory (ROM) 6, the RAM 7, an image memory 8, a faxmodem 10, a Network Control Unit (NCU) 11, and a Local Area Network (LAN) interface circuit 12. Units 1-12 are connected via a bus 13. The NCU 11 is connected to a facsimile machine of another end via a Public Switched Telephone Network (PSTN) L.

The facsimile machine 20 includes a conventional G3 facsimile communication function. The main control unit 1 includes a CPU, and is connected to and controls hardware components 2-12 via the bus 13. The main control unit 1 executes various software functions to be described later.

The image scanning unit 2 scans an original document by a scanner using a Charge Coupled Device (CCD) or the like, and outputs dot image data converted in a binary of black and white. The image printing unit 3 is an electrophotographic printer, a thermal printer, an inkjet printer or the like, and prints out image data received from another facsimile machine by facsimile communication as hardcopy. The display unit 4 is a display device such as a Liquid Crystal Display (LCD) or a Cathode Ray Tube (CRT) display. The display unit 4 displays an operation status of the facsimile machine 20, and also displays image data of a transmission original document and received image data. The operation unit 5 includes alphabetic keys, a ten-key numeric pad for dialing, speed-dial keys, one-touch dial keys, and various other function keys or the like necessary for operating the facsimile machine 20. By providing the display unit 4 as a touch screen, a portion or all of the various keys of the operation unit 5 may be substituted.

The ROM 6 previously stores various software programs to be executed by the main control unit 1 to operate the facsimile machine 20, including a program for receiving facsimiles as illustrated in FIGS. 3A and 3B. The RAM 7 is a Static RAM (SRAM), a flash memory or the like. The RAM 7 is used as a working area of the main control unit 1, and stores temporary data generated when a program is executed. When a flash memory is used as the RAM 7, contents of data stored in the RAM 7 are not lost even if a power source is lost due to a power failure, moving of the facsimile machine 20 or the like. The image memory 8 is a Dynamic RAM (DRAM) or the like, and stores transmission image data and/or received image data. Further, the RAM 7 and the image memory 8 may be formed by a hard disk memory.

The RAM 7 stores the EQM data table 7a illustrated in FIG. 2. As illustrated in FIG. 2, for each transmission mode and transmission speed, the EQM data table 7a stores an average value of an EQM value, fluctuation of an EQM value, and a number of error lines of image data. The fluctuation of the EQM value is a difference between a maximum EQM value and a minimum EQM value.

The faxmodem 10 is connected to the PSTN L via the NCU 11, and can function as a faxmodem for general facsimile communication. The faxmodem 10 demodulates data of transmitter telephone number information received as a Frequency-Shift Keying (FSK) signal, and outputs the demodulated data to the main control unit 1. The NCU 11 is a hardware circuit including an automatic dial function which carries out an operation for connecting and disconnecting a direct current loop or the like of the analog PSTN L. According to necessity, the NCU 11 connects the faxmodem 10 to the PSTN L. The NCU 11 detects an ID receiving terminal actuation signal of a caller ID notification service and a general telephone calling signal. According to necessity, the NCU 11 transmits a primary response signal and a secondary response signal in the caller ID notification service. The NCU 11 may be connected to a digital communication line of a baseband transmission system such as an Integrated Services Digital Network (ISDN) via a prescribed terminal adaptor and a Digital Service Unit (DSU).

Facsimile machine 20 includes a general G3 facsimile communication function. The dot image data scanned by the image scanning unit 2 is encoded by software according to a coding scheme defined in a facsimile communication standard, for example, the Modified Huffman (MH), the Modified Read (MR) or the Modified MR (MMR). Then, the encoded data is transmitted to a facsimile machine of another end. Meanwhile, coded data received from the facsimile machine of the other end is decoded into image data by software, and output as hardcopy from the image printing unit 3. Further, the image memory 8 stores and outputs image data as required.

A communication protocol of a V.34 mode capable of carrying out high-speed data communication such as facsimile communication is now described. When carrying out data communication by a communication terminal device such as a facsimile machine, a MODEM is used according to a half-duplex communication protocol of V.17 mode of the International Telecommunication Union-Telecommunications (ITU-T) Recommendation, and the data communication is carried out according to a protocol defined in the Recommendation T.30, which is also the facsimile communication protocol of the G3 standard. An ultrahigh-speed communication protocol is also used which the maximum transmission speed is 33.6 kbps according to V.34 mode of the Recommendation (hereinafter referred to as "V.34 mode communication protocol"). Under the V.34 mode communication protocol, at the start of the communication and during the communication, a recipient can designate a communication speed according to the state of the communication line at that point of time, specifically, a Signal-to-Noise (S/N) ratio and/or a bandwidth. A transmitter changes the communication speed to transmit under the designated communication speed. Further, when carrying out data communication by the V.34 mode communication protocol, an actual communication speed is determined by carrying out a preprotocol by a V.8 mode communication protocol of the Recommendation.

FIGS. 3A and 3B are flowcharts illustrating a facsimile reception process executed by the main control unit 1 of the facsimile machine 20 of FIG. 1.

At step S1 of FIG. 3A, a determination is made as to whether or not an incoming call has been received. When it is determined "YES" at step S1, the process proceeds onto step S2. When it is determined "NO" at step S1, the process returns to step S1 again, and the process is repeated. At step S2, the facsimile machine 20 receives a calling tone signal (CNG signal) and transmits a called station identification signal (CED signal). At step S3, the facsimile machine 20 transmits a nonstandard facilities signal (NSF signal) and a digital identification signal (DIS signal), and receives a transmitter subscriber identification signal (TS1 signal) and a digital command signal (DCS signal). At step S4, the facsimile machine 20 receives a training check function signal (TCF signal), samples and measures an EQM value, and temporarily stores the measured data of the EQM value of a prescribed period in the RAM 7. At step S5, the main control unit 1 calculates an average value and fluctuation of the EQM value according to the measured data of the EQM value. At step S6, the main control unit 1 compares the calculated average value and the fluctuation of the EQM value with an average value and fluctuation of the EQM value stored in the EQM data table 7a, respectively. At step S7, a determination is made as to whether or not the calculated average value and the fluctuation of the EQM value match the average value and the fluctuation of the EQM value stored in the EQM data table 7a. When it is determined "YES" at step S7, the process proceeds onto step S7A. When it is determined "NO" at step S7, the process proceeds onto step S8.

At step S7A, a determination is made as to whether or not a number of error lines of the image data associated with the matched average value and the fluctuation of the EQM value stored in the EQM data table 7a exceeds 0. When it is determined "YES" at step S7A, the process proceeds onto step S8. Meanwhile, when it is determined "NO" at step S7A, the process proceeds onto step S9. At step S9, the main control unit 1 transmits a confirmation to receive signal (CFR signal) After transmitting a failure to train signal (FTT signal) at step S8, the process returns to step S4. At step S10, the facsimile machine 20 receives image data, samples and measures an EQM value, temporarily stores the measured data of the EQM value of a prescribed period in the RAM 7, and measures a number of error lines of the received image data. At step S11, the main control unit 1 calculates an average value and fluctuation of the EQM value according to the measured data of the EQM value. At step S12, the calculated average value and the fluctuation of the EQM value and the measured number of error lines are stored in the EQM data table 7a. When the newly stored data is compared with the data already stored in the EQM data table 7a, and the newly stored data is of the same transmission mode, the same transmission speed, and the same average value of the EQM value as the data already stored in the EQM data table 7a, fluctuation and a number of error lines having a larger value than the already stored data are overwritten and stored. At step S13, a determination is made as to a presence or an absence of a next page. When it is determined "YES" at step S13, the process returns to step S10 and the process is repeated. When it is determined "NO" at step S13, the process proceeds onto step S14. At step S14, the communication line is disconnected. The process returns to step S1 again and the process is repeated.

According to above-described embodiment, the facsimile machine 20 receives image data from a facsimile machine of another end, and the RAM 7 measures an average value and fluctuation of the EQM value of the image data and a number of error lines of the image data and stores as the EQM data table 7a. In a past facsimile communication, the main control unit 1 receives a training signal from the facsimile machine of the other end, and executes the training process (step S4 of FIG. 3A). The main control unit 1 measures the average value and the fluctuation of the EQM value of the training signal (steps S4 and S5). The main control unit 1 compares the measured average value and the fluctuation of the EQM value with the average value and the fluctuation of the EQM value stored in the EQM data table (steps S6 and S7). When the measured average value and the fluctuation of the EQM value do not match with the average value and the fluctuation of the EQM value stored in the EQM data table (step S7: NO), the main control unit 1 executes the training process again (step S8). When the measured average value and the fluctuation of the EQM value match the average value and the fluctuation of the EQM value stored in the EQM data table (step S7: YES), the main control unit 1 controls to receive the image data (steps S9 and S10). Since a transmission route is determined according to the previously measured EQM value of the image data, the facsimile machine 20 receives the image data more reliably.

In the above-described facsimile machine 20, the main control unit 1 compares the measured average value and the fluctuation of the EQM value with the average value and the fluctuation of the EQM value stored in the EQM data table. When the measured average value and the fluctuation of the EQM value match the average value and the fluctuation of the EQM value stored in the EQM data table, before receiving the image data (steps S9 and S10), in case the number of error lines of the image data stored in the EQM data table associated with the average value and the fluctuation of the EQM value exceeds 0 (step S7A: YES), the main control unit 1 executes the training process again (step S8). Since the transmission route is determined according to the previously measured number of error lines of the image data, the facsimile machine 20 receives the image data more reliably.

While the present invention has been described with respect to embodiments thereof, it will be apparent to those skilled in the art that the disclosed invention may be modified in numerous ways and may assume many embodiments other than those specifically set out and described above. Accordingly, the appended claims are intended to cover all modifications of the present invention that fall within the true spirit and scope of the present invention.

What is claimed is:

1. A communication terminal device comprising:
    means for storing, wherein when receiving image data by facsimile from a communication terminal device of another end, the means for storing stores a measured average value and fluctuation of an eye quality monitor (EQM) value of the image data and a number of error lines of the received image data as an EQM data table; and
    means for controlling to receive a training signal from the communication terminal device of the other end in a past facsimile communication, execute a training process, measure an average value and fluctuation of an EQM value of the training signal, compare the measured average value and the fluctuation of the EQM value with the average value and the fluctuation of the EQM value stored in the EQM data table, and execute the training process again when the measured average value and the fluctuation of the EQM value do not match the average value and the fluctuation of the EQM value stored in the EQM data table.

2. The communication terminal device according to claim 1, wherein the training signal is a training check function (TCF) signal.

3. The communication terminal device according to claim 1, wherein when the measured average value and the fluctuation of the EQM value match the average value and the fluctuation of the EQM value stored in the EQM data table, the means for controlling controls to receive the image data.

4. The communication terminal device according to claim 3, wherein when the measured average value and the fluctuation of the EQM value match the average value and the fluctuation of the EQM value stored in the EQM data table, before receiving the image data, in case a number of error lines of the image data stored in the EQM value data table associated with the matched average value and the fluctuation of the EQM value exceeds 0, the means for controlling executes the training process again.

5. The communication terminal device according to claim 1 wherein, for each transmission mode and transmission speed, the means for storing stores in the EQM data table the measured average value and fluctuation of the EQM value, and the number of error lines of the received image data.

6. The communication terminal device according to claim 5, wherein the fluctuation of the EQM value is a difference between a maximum EQM value and a minimum EQM value.

7. The communication terminal device according to claim 5, wherein when the measured fluctuation of the EQM value and the number of error lines have larger values than a previously stored fluctuation and number of error lines for a same transmission mode, speed and average EQM value, data in the EQM data table for the same transmission mode, speed and average EQM value is overwritten with the measured fluctuation and number of error lines having larger values.

8. A control method of a communication device, the method comprising the steps of:
  receiving image data by facsimile from a communication terminal device of another end;
  measuring an average value and fluctuation of an eye quality monitor (EQM) value of the image data and a number of error lines of the image data, and storing as an EQM data table;
  executing a training process by receiving a training signal from the communication terminal device of the other end in a past facsimile communication;
  measuring an average value and fluctuation of an EQM value of the training signal; and
  comparing the measured average value and the fluctuation of the EQM value with the average value and the fluctuation of the EQM value stored in the EQM data table, and when the measured average value and the fluctuation of the EQM value do not match the average value and the fluctuation of the EQM value stored in the EQM data table, executing the training process again.

9. The control method of the communication device according to claim 8, wherein the training signal is a training check function (TCF) signal.

10. The control method of the communication device according to claim 8, the method further comprising the step of receiving the image data when the measured average value and the fluctuation of the EQM value match the average value and the fluctuation of the EQM value stored in the EQM data table.

11. The control method of the communication device according to claim 10, the method further comprising the step of executing the training process again before receiving the image data when the measured average value and the fluctuation of the EQM value match the average value and the fluctuation of the EQM value stored in the EQM data table, and the number of the error lines of the image data stored in the EQM value data table associated with the matched average value and the fluctuation of the EQM value exceeds 0.

12. The control method of the communication device according to claim 8, wherein, for each transmission mode and transmission speed of the communication device, the measured average value and fluctuation of the EQM value, and the number of error lines of the received image data.

13. The control method of the communication device according to claim 12, wherein the fluctuation of the EQM value is a difference between a maximum EQM value and a minimum EQM value.

14. The control method of the communication device according to claim 12, wherein when the measured fluctuation of the EQM value and the number of error lines have larger values than a previously stored fluctuation and number of error lines for a same transmission mode, speed and average EQM value, data in the EQM data table for the same transmission mode, speed and average EQM value is overwritten with the measured fluctuation and number of error lines having larger values.

15. A facsimile machine comprising:
  a random access memory (RAM), wherein when receiving image data from another facsimile machine, the RAM stores a measured average value and fluctuation of an eye quality monitor (EQM) value of the image data and a number of error lines of the received image data as an EQM data table; and
  a central processing unit (CPU) that executes a training process comprising: receiving a training check function (TCF) signal from the another facsimile machine in a past facsimile communication, measuring an average value and fluctuation of an EQM value of the TCF signal, comparing the measured average value and the fluctuation of the EQM value with the average value and the fluctuation of the EQM value stored in the EQM data table, and executing the training process again when the measured average value and the fluctuation of the EQM value do not match the average value and the fluctuation of the EQM value stored in the EQM data table.

16. The facsimile machine according to claim 15, wherein when the measured average value and the fluctuation of the EQM value match the average value and the fluctuation of the EQM value stored in the EQM data table, the CPU controls to receive the image data.

17. The facsimile machine according to claim 16, wherein when the measured average value and the fluctuation of the EQM value match the average value and the fluctuation of the EQM value stored in the EQM data table, before receiving the image data, in case a number of error lines of the image data stored in the EQM value data table associated with the matched average value and the fluctuation of the EQM value exceeds 0, the CPU executes the training process again.

18. The facsimile machine according to claim 15 wherein, for each transmission mode and transmission speed, the RAM stores in the EQM data table the measured average value and fluctuation of the EQM value, and the number of error lines of the received image data.

19. The facsimile machine according to claim 18, wherein the fluctuation of the EQM value is a difference between a maximum EQM value and a minimum EQM value.

20. The facsimile machine according to claim 18, wherein when the measured fluctuation of the EQM value and the number of error lines have larger values than a previously stored fluctuation and number of error lines for a same transmission mode, speed and average EQM value, data in the EQM data table for the same transmission mode, speed and average EQM value is overwritten with the measured fluctuation and number of error lines having larger values.

* * * * *